(12) United States Patent
Parikh et al.

(10) Patent No.: US 10,192,165 B2
(45) Date of Patent: Jan. 29, 2019

(54) SYSTEM AND METHOD FOR NAVIGATING MULTI-DIMENSIONAL DECISION TREES USING ACCEPTABLE ALTERNATE NODES

(71) Applicant: VMware, Inc., Palo Alto, CA (US)

(72) Inventors: Aashish Parikh, Cupertino, CA (US); Jeevitha Kirubanandam, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 633 days.

(21) Appl. No.: 14/675,595

(22) Filed: Mar. 31, 2015

(65) Prior Publication Data

US 2016/0292579 A1    Oct. 6, 2016

(51) Int. Cl.
| | |
|---|---|
| *G06F 9/46* | (2006.01) |
| *G06N 5/04* | (2006.01) |
| *H04L 12/713* | (2013.01) |
| *H04L 12/751* | (2013.01) |

(52) U.S. Cl.
CPC ............... *G06N 5/045* (2013.01); *G06F 9/46* (2013.01); *H04L 45/02* (2013.01); *H04L 45/586* (2013.01)

(58) Field of Classification Search
None
See application file for complete search history.

(56) References Cited

U.S. PATENT DOCUMENTS

| | | | | |
|---|---|---|---|---|
| 5,539,883 | A  * | 7/1996 | Allon | G06F 9/5088 370/237 |
| 2007/0130344 | A1 * | 6/2007 | Pepper | G06F 3/0613 709/227 |
| 2010/0332475 | A1 * | 12/2010 | Birdwell | G06F 17/30333 707/737 |
| 2012/0324445 | A1 * | 12/2012 | Dow | G06F 9/45504 718/1 |
| 2014/0324871 | A1 * | 10/2014 | Ray | G06F 17/30705 707/740 |
| 2015/0012465 | A1 * | 1/2015 | Pingenot | G06N 5/025 706/12 |
| 2016/0294934 | A1 * | 10/2016 | Kirubanandam | G06F 9/00 |

OTHER PUBLICATIONS

Gelly, S., Kocsis, L., Schoenauer, M., Sebag, M., Silver, D., Szepesvári, C., & Teytaud, O. (2012). The grand challenge of computer Go: Monte Carlo tree search and extensions. Communications of the ACM, 55(3), 106-113.*

(Continued)

*Primary Examiner* — Alexey Shmatov
*Assistant Examiner* — Oluwatosin O Alabi
(74) *Attorney, Agent, or Firm* — Loza & Loza, LLP

(57) ABSTRACT

A decision tree analysis system and method for navigating a multi-dimensional decision tree uses acceptable alternative child nodes of a target child node to select an end child node for a parent node, where the parent node and the final child node define a single step of a navigation path for the multi-dimensional decision tree. The acceptable alternative child nodes are based on an acceptance delta parameter for a particular attribute, which defines a value range about an attribute value of the target child node within which a child node is determined to be an acceptable alternative child node of the target child node.

24 Claims, 7 Drawing Sheets

(56) References Cited

OTHER PUBLICATIONS

Dutta, S., Gera, S., Verma, A., & Viswanathan, B. (Jun. 2012). Smartscale: Automatic application scaling in enterprise clouds. In Cloud Computing (CLOUD), 2012 IEEE 5th International Conference on (pp. 221-228). IEEE. (Year: 2012).*
Gulati et al. "Distributed Resource Management: Design, Implementation and Lessons Learned"; VMware TechPubs, 2012.
Shanmuganathan, Ganesha et al.; "PRM: Proactive Resource Management Using Spare Resources"; VMware Radio, 2013.
Proactive DRS fling http://labs.vmware.com/flings/proactive-drs/, version 1.0; Aug. 26, 2013.

* cited by examiner

SYSTEM AND METHOD FOR NAVIGATING MULTI-DIMENSIONAL DECISION TREES USING ACCEPTABLE ALTERNATE NODES

BACKGROUND

Decision trees are commonly used in decision analyses to reach a goal that satisfy one or more conditions. As an example, a decision tree may be used to improve the state of a system from the current state to a desired state of the system by navigating through the decision tree by making decisions along the decision tree. In this example, a metric that represents the state of the system may be used to navigate the decision tree from a root node on the decision tree to a final node on the decision tree, including any intervening nodes on the decision tree.

One technique to navigate a decision tree is by using a greedy algorithm to select nodes on the decision tree with the highest or lowest value for an attribute of interest among possible nodes. Specifically, at each parent node on the decision tree, the greedy algorithm selects the child node of that parent node that has the highest or lowest value for the attribute with respect to all the child nodes of the parent node. For the selected child node, the process is repeated until a certain termination condition is met.

When there is only one attribute being considered in a decision tree (one-dimensional decision tree), the use of a greedy algorithm to traverse the decision tree is fairly straight-forward. However, when there are multiple attributes being considered in a decision tree (multi-dimensional decision tree), the use of a greedy algorithm to traverse such a decision tree is challenging since a child node of a parent node with the highest or lowest value for a particular attribute may not be the optimal choice for the other attributes.

SUMMARY

A decision tree analysis system and method for navigating a multi-dimensional decision tree uses acceptable alternative child nodes of a target child node to select an end child node for a parent node, where the parent node and the final child node define a single step of a navigation path for the multi-dimensional decision tree. The acceptable alternative child nodes are based on an acceptance delta parameter for a particular attribute, which defines a value range about an attribute value of the target child node within which a child node is determined to be an acceptable alternative child node of the target child node.

A method for navigating a multi-dimensional decision tree in accordance with an embodiment of the invention comprises determining a target child node from a plurality of child nodes of a parent node on the multi-dimensional decision tree based on a first attribute value of each of the child nodes, determining any acceptable alternative child node of the target child node from the plurality of child nodes based on an acceptance delta parameter for the first attribute value, the acceptance delta parameter defining a value range about the first attribute value of the target child node within which a child node is determined to be an acceptable alternative child node of the target child node, and selecting an end child node from the target child node and any acceptable alternative child node based on a second attribute value of each of the target child node and any acceptable alternative child node, wherein the parent node and the end child node define a single step of a navigation path for the multi-dimensional decision tree. In some embodiments, the steps of this method are performed when program instructions contained in a computer-readable storage medium is executed by one or more processors.

A decision tree analysis in accordance with an embodiment of the invention comprises an interface unit and a decision engine. The interface unit is configured to receive a request for a decision tree analysis of a multi-dimensional decision tree. The decision engine is configured to: determine a target child node from a plurality of child nodes of a parent node on the multi-dimensional decision tree based on a first attribute value of each of the child nodes; determine any acceptable alternative child node of the target child node from the plurality of child nodes based on an acceptance delta parameter for the first attribute value, the acceptance delta parameter defining a value range about the first attribute value of the target child node within which a child node is determined to be an acceptable alternative child node of the target child node; and select an end child node from the target child node and any acceptable alternative child node based on a second attribute value of each of the target child node and any acceptable alternative child node, wherein the parent node and the end child node define a single step of a navigation path for the multi-dimensional decision tree.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
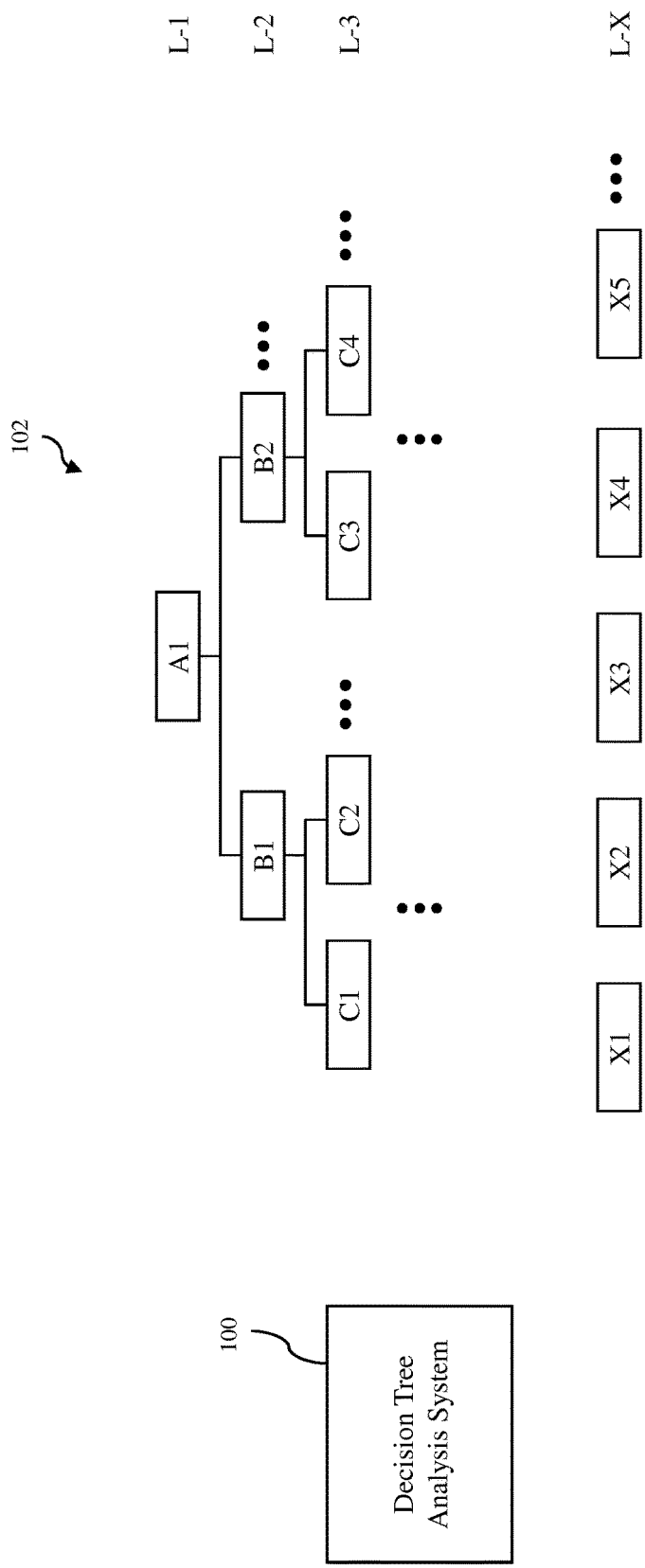
FIG. 1 shows a decision tree analysis system and an example of a multi-dimensional decision tree in accordance with an embodiment of the invention.

Turning now to FIG. 1, a decision tree analysis system 100 in accordance with an embodiment of the invention is shown with an exemplary decision tree 102. The decision tree includes nodes A1, B1, B2, C1, C2, C3, C4, X1, X2, X3, X4 . . . having multiple attributes that need to be considered. Thus, the decision tree is a multi-attribute or multi-dimensional decision tree. The decision tree includes a number of levels L-1, L-2, L-3 . . . L-X (where X is a positive integer). The first or highest level L-1 includes only the root node A1, which is the starting node for navigating the decision tree. Each of the other levels includes possible child nodes of one or more nodes on the previous level, i.e., the level immediately above the level with the child nodes. The number of possible nodes on each level of the decision tree can vary depending on the underlying conditions or variables being represented by the decision tree. In addition, the number of possible child nodes for each of the possible parent nodes can vary from one to any number of nodes. Furthermore, the number of attributes of each possible node can vary from two to any number greater than two. The final or terminating node of the decision tree can be any node on the decision tree at which one or more conditions are satisfied. In some embodiments, the final node may be any node located on a particular level of the decision tree. Thus, when a node on the particular level has been selected, that node will be considered the final node. In other embodiments, a selected node may the final node when one or more attributes of the selected node have met some thresholds.

The process of navigating through the decision tree 102 begins at the root node A1 on the level L-1, which has several child nodes on the level L-2, i.e., the nodes B1, B2 . . . . . Among these child nodes, one of them must be selected. Once one of the child nodes on the level L-2 has been selected, the child nodes of that node on level L-3 must be selected unless that the selected child node on the level L-2 is the final node. This process is repeated until the final node has been selected.

As described in more detail below, the decision tree analysis system 100 operates to navigate through a decision tree, e.g., the decision tree 102, by selecting nodes on the decision tree using "acceptable alternative nodes" until the final node on the decision tree has been selected. As used herein, "acceptable alternative child nodes" are nodes on the same level of a decision tree having similar metric values as a target node for a particular attribute. This determination of whether metric values of an attribute are similar to a target node is defined using an acceptance parameter, which may be preset or manually set by a user. In an embodiment, the acceptance parameters for the different attributes of the nodes on a decision tree may be the same, e.g., the same value. In other embodiments, some of the acceptance parameters for the different attributes of the nodes on a decision tree may be the same while one or more other acceptance parameters may be different. In still other embodiments, each of the acceptance parameters for the different attributes of the nodes on a decision tree may be unique. In still other embodiments, at least some of the acceptance parameters may be a function of metrics based on the current state. The use of acceptable alternative nodes, which are selected using the acceptance parameters, allows the decision tree analysis system to navigate through multi-dimensional decision trees, taking into consideration different node attributes.

Figure 2:
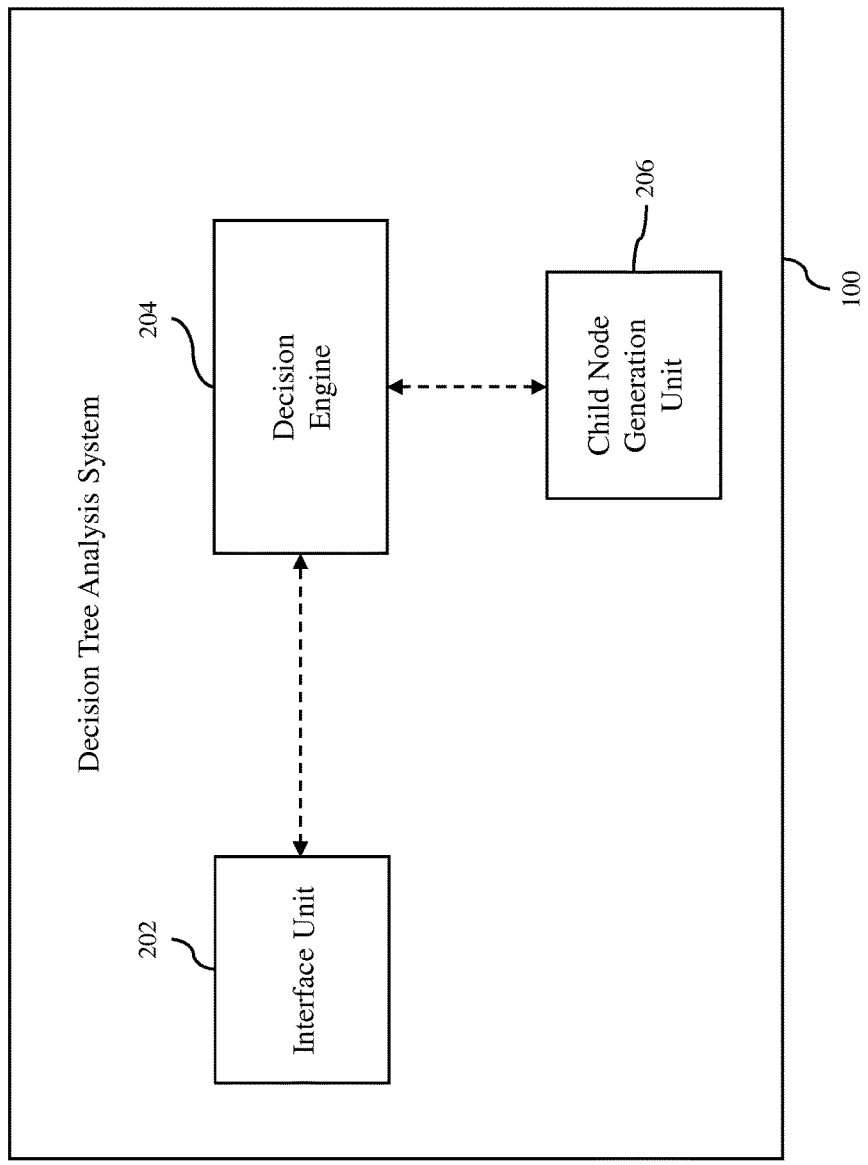
FIG. 2 is a block diagram of components of the decision tree analysis system in accordance with an embodiment of the invention.

Turning now to FIG. 2, components of the decision tree analysis system 100 in accordance with an embodiment of the invention are shown. As shown in FIG. 2, the decision tree analysis system includes an interface unit 202, a decision engine 204 and an optional child node generation unit 206. These components of the decision tree analysis system can be implemented as software, hardware or a combination of software and hardware. In some embodiments, at least some of these components of the decision tree analysis system are implemented as one or more software programs running in one or more computer systems using one or more processors associated with the computer systems.

The interface unit 202 of the decision tree analysis system 100 allows the decision tree analysis system to communicate with an external entity, which may be any entity that can interact with the decision tree analysis system, such as another system, a device, a circuit or a software module/program. The interface unit allows the decision tree analysis system to receive instructions for a decision tree analysis request. When a decision tree analysis is requested, the interface unit may receive various data associated with the decision tree analysis request, such as a description of a decision tree to be analyzed and other data needed for the analysis, e.g., parameter values, state information, variables and/or other data associated with nodes of the decision tree. The interface unit also allows the results of a decision tree analysis to be transmitted back to the requesting entity from the decision tree analysis system. The results of a decision tree analysis request include at least the final node on the decision tree, and may also include intervening nodes on the decision tree between the root node on the decision tree and the final node on the decision tree, which represent a navigation path from the root node to the final node. The results may further include other information that was derived by the decision tree analysis.

The decision engine 204 of the decision tree analysis system 100 operates to recursively select a child node for a given node on a decision tree until the final node has been selected to determine a decision path of the decision tree in consideration of the different attributes of the nodes on the decision tree. The operation of the decision engine begins with the root node of a decision tree and ends with the final node on the decision. In an embodiment, each selection of a child node of a given node is a single step from the level of the decision tree on which the given node is situated to the next lower level of the decision tree on which the child node is situated. By sequentially taking these steps from the root node down to the final node, the decision engine is able to navigate through the decision tree to reach the final node of the decision tree.

For each decision to select a child node of a given parent node, the decision engine 204 determines a target child node among the child nodes of that parent node using a predefined criterion for the first attribute and then determines any other child node of that parent node that can be considered to be an acceptable alternative to the target child node with respect to that attribute, i.e., an "acceptable alternative child node". As an example, in some embodiments, the predefined criterion for the target child node selection may be the child node having the maximum or minimum value for the attribute being considered. In these embodiments, the decision engine determines the child node with the highest or lowest value for the attribute being considered as the target child node. As another example, in other embodiments, the predefined criterion for the target child node selection may be the child node having a value for the attribute being considered that is closest to a target value.

After the target child node has been determined, an acceptance parameter for the attribute currently being considered is used to determine whether there is any other child node that can be considered to be an acceptable alternative to the selected target child node. The target child node and any acceptable alternative nodes are grouped together as candidate child nodes to determine the target child node and any acceptable alternative nodes for the next attribute. This determination of candidate child nodes is repeated until the last attribute is being considered, at which point only the target child node from the latest group of candidate child nodes is selected. This process of selecting a child node for a parent node is repeated until the final child node is selected. When the final child node on the decision tree has been selected, the decision tree analysis operation of the decision engine comes to an end.

The order of the attributes considered by the decision engine 204 can be determined or set using any means. In an embodiment, the decision engine may use a static ordering of the attributes based on their importance, which may be predefined by a user or an administrator. In another embodiment, the decision engine may define the order in which the attributes will be evaluated based on their current state. For example, if there is no resource contention, memory (an attribute) will get precedence over CPU (another attribute) since it is harder to reclaim memory. However, if there is CPU contention, then the order will be flipped automatically.

Below is an example of a multi-dimensional decision algorithm executed by the decision engine 204 in accordance with an embodiment of the invention to select a child node of a parent node to increase a decision path through a decision tree by one step. In this multi-dimensional decision algorithm, k represents the number of attributes associated with each node on the decision tree.

1. Set i=1, set equivalence class e_0 to contain all child nodes of a parent node on the decision tree (initially, the parent node is the root node)
2. while (i<k), do:
   2.1. Use the greedy choice from e_(i−1) with respect to attribute #i and acceptance parameter deli to define an equivalence class e_i.
   2.2. i=i+1
3. Return greedy choice from e_(k−1) with respect to attribute #k Step 1 of the algorithm defines the initial group of candidate child nodes of a parent node from which a node selection will be made. Specifically, an equivalence class is set to contain all child nodes of the parent node. Step 2 of the algorithm reduces the group of candidate child nodes for each attribute by selecting a target child node and any acceptable alternative child nodes from the previous group of candidate child nodes. Specifically, in this embodiment, for each attribute, a greedy choice is made from the previous equivalence class and any acceptable alternative child nodes are determined using the acceptance parameter for that attribute. Then, the next equivalence class is set to contain the greedy choice and any acceptable alternative child nodes. This process is repeated until the last attribute has been considered. Step 3 of the algorithm defines the child node selection as the greedy choice for the last attribute. This child node selection for the parent node defines one step of the total navigation path for the decision tree. The child node selection process is repeated until the final node on the decision tree has been selected to complete the navigation path.

Figure 3:
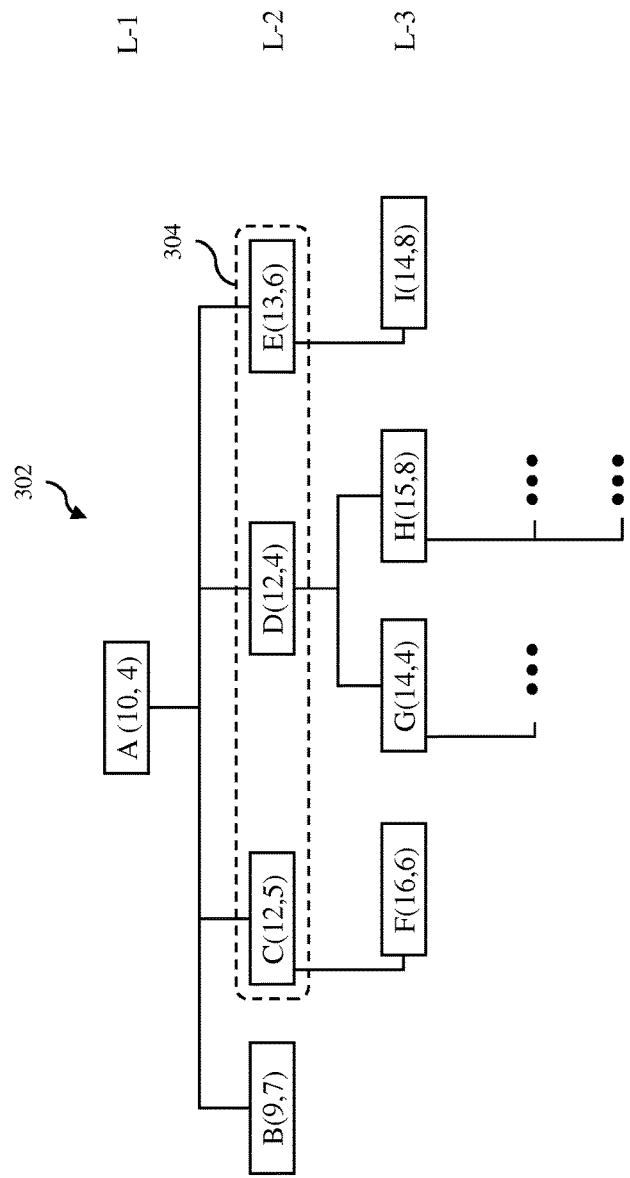
FIG. 3 illustrates a multi-dimensional decision algorithm executed by a decision engine of the decision tree analysis system using an example of a multi-dimensional decision tree in accordance with an embodiment of the invention.

The multi-dimensional decision algorithm executed by the decision tree engine 204 is further described using a decision tree 302 shown in FIG. 3 as an example. In this example, each node of the decision tree has two attributes that are defined by numerical values, i.e., k=2. In addition, in this example, there is only one acceptance parameter δ for the first attribute that equals one (1), i.e., δ(1)=1. Furthermore, in this example, the greedy choice for a particular attribute is the child node with the highest value for that attribute.

When initiated, the multi-dimensional decision algorithm determines a decision path for the decision tree by sequentially selecting a child node of a parent node on the decision tree starting from the root node, where each selected child node is used as the next parent node until the final child node is selected. In the example illustrated in FIG. 3, the multi-dimensional decision algorithm begins by selecting one of the child nodes B, C, D and E of the root node A to determine the first single step of the decision path.

In order to select one of the child nodes B, C, D and E of the root node A, the multi-dimensional decision algorithm defines an equivalence class e_0 as containing all the child nodes of the root node, i.e., the child nodes B, C, D and E. The multi-dimensional decision algorithm then defines an equivalence class e_1 using the greedy choice from the class e_0 for the first attribute, i.e., the target child node selected from the child nodes B, C, D and E for the first attribute, and any acceptable alternative child nodes using the acceptance parameter δ(1)=1. In this example, the greedy choice is the child node E since it has the highest first attribute value of "13", and the child nodes C and D are acceptable alternative child nodes since they both have a first attribute value of "12", which is within the acceptance value range defined by the acceptance parameter δ(1)=1. Thus, the equivalence class e_1 includes the child nodes C, D and E, as indicated by the reference number 304 in FIG. 3. Since the second attribute is the last attribute for this example, the multi-dimensional decision algorithm then selects the greedy choice from the equivalence class e_1 for the second attribute, which is the child node E.

The multi-dimensional decision algorithm then repeats the process to select a child node of the selected node E. In this example, there is only one child node for the node E, which is the child node F. Thus, the decision path of the decision tree determined by the multi-dimensional decision algorithm is as follows: node A-node E-node I.

In some embodiments, if there are two or more child nodes with the same attribute value for the greedy choice, then the multi-dimensional decision algorithm may selected one of the child nodes with the same attribute value at random or using some other selection method, such as the first child node or the last child node.

Turning back to FIG. 2, the optional child node generation unit 206 of the decision tree analysis system 100 operates to generate one or more child nodes for a giving node on a decision tree being analyzed. The child nodes that are generated by the child node generation unit depend on the decision tree and what the nodes on the decision tree represent. As an example, if each node on a decision tree represents the state of a cluster of computers with certain configuration, then the child nodes that are generated by the child node generation unit may represent different possible states of the computer cluster from the state represented by the parent node of these child nodes. Thus, the computations that are performed by the child node generation units can vary depending on the representations of the nodes on the decision tree. The child node generation unit may use any known computations on the metrics that describe nodes on a decision tree to generate child nodes. The metrics needed for these computations may be provided by the entity requesting the decision tree analysis.

In some embodiments, the child node generation may not be performed by the decision tree analysis system 100. In these embodiments, child nodes of a given node on a decision tree may be provided to the decision tree analysis system from an external source, such as the requesting entity. Thus, when a child node is selected by the decision engine 204, the selection is transmitted to the requesting entity or the external source so that the requesting entity or the external source can provide child node information for the selected node to the decision tree analysis system, specifically to the decision engine.

Figure 4:
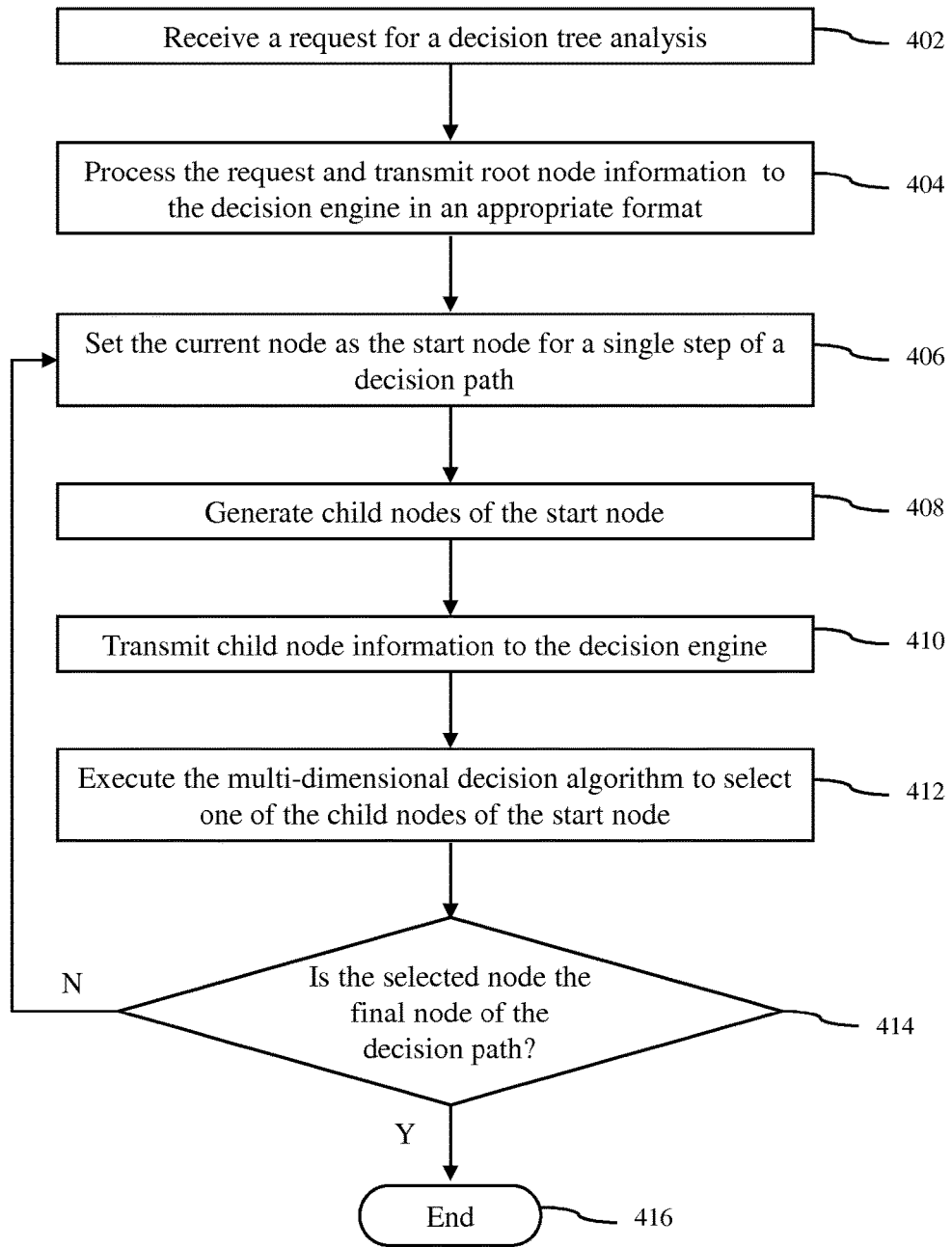
FIG. 4 is a process flow diagram showing the operation of the decision tree analysis system in accordance with an embodiment of the invention.

The operation of the decision tree analysis system 100 in accordance with an embodiment of the invention is now described with reference to the process flow diagram of FIG. 4. At block 402, a request for a decision tree analysis is received by the interface unit 202 of the decision tree analysis system. The request can be from any entity that can access the decision tree analysis system. The request includes information regarding the root node of the decision tree, such as attribute values for the root node.

Next, at block 404, the request is processed and root node information is transmitted to the decision engine 204 in an appropriate format by the interface unit 202. Next, at block 406, the root node is set by the decision engine as the start node for a single step of a decision path to be determined by the decision engine. Next, at block 408, child nodes of the start node are generated by the child node generation unit 206 in response to instructions from the decision engine. Next, at block 410, child node information is transmitted to the decision engine. In an alternative embodiment, the child node generation may be performed by the decision engine. In another alternative embodiment, the child node generation may be performed by a processing module external to the decision tree analysis system 100, which may be part of or associated with the entity requesting the decision tree analysis. In this embodiment, the request for child node generation is transmitted to the external processing module via the interface unit and the child node information is received by the decision engine via the interface unit.

Next, at block 412, the decision engine 204 executes the multi-dimensional decision algorithm to select one of the child nodes as the end node for the current decision path step. The operation then proceeds to block 414, where a determination is made by the decision engine whether the selected child node is the final node of the decision path. If the selected child node is the final node of the decision path, the operation proceeds to block 416, where the operation comes to an end. If the selected child node is not the final node of the decision path, the operation proceeds back to block 406, where the current node, i.e., the selected child node, is set as the next start node. The operation continues until the final node of the decision path has been determined.

In some implementations, the decision tree analysis system 100 is used to analyze a distributed computer system in order to determine an appropriate course of action to try to improve the operational state of the distributed computer system. As an example, the decision tree analysis system may be used to analyze a cluster of host computers running clients, such as virtual machines, to determine whether one or more clients should be migrated or moved to other host computers in the cluster for load balancing. An example of a distributed computer system that can be analyzed by the decision tree analysis system is shown in FIG. 5.

Figure 5:
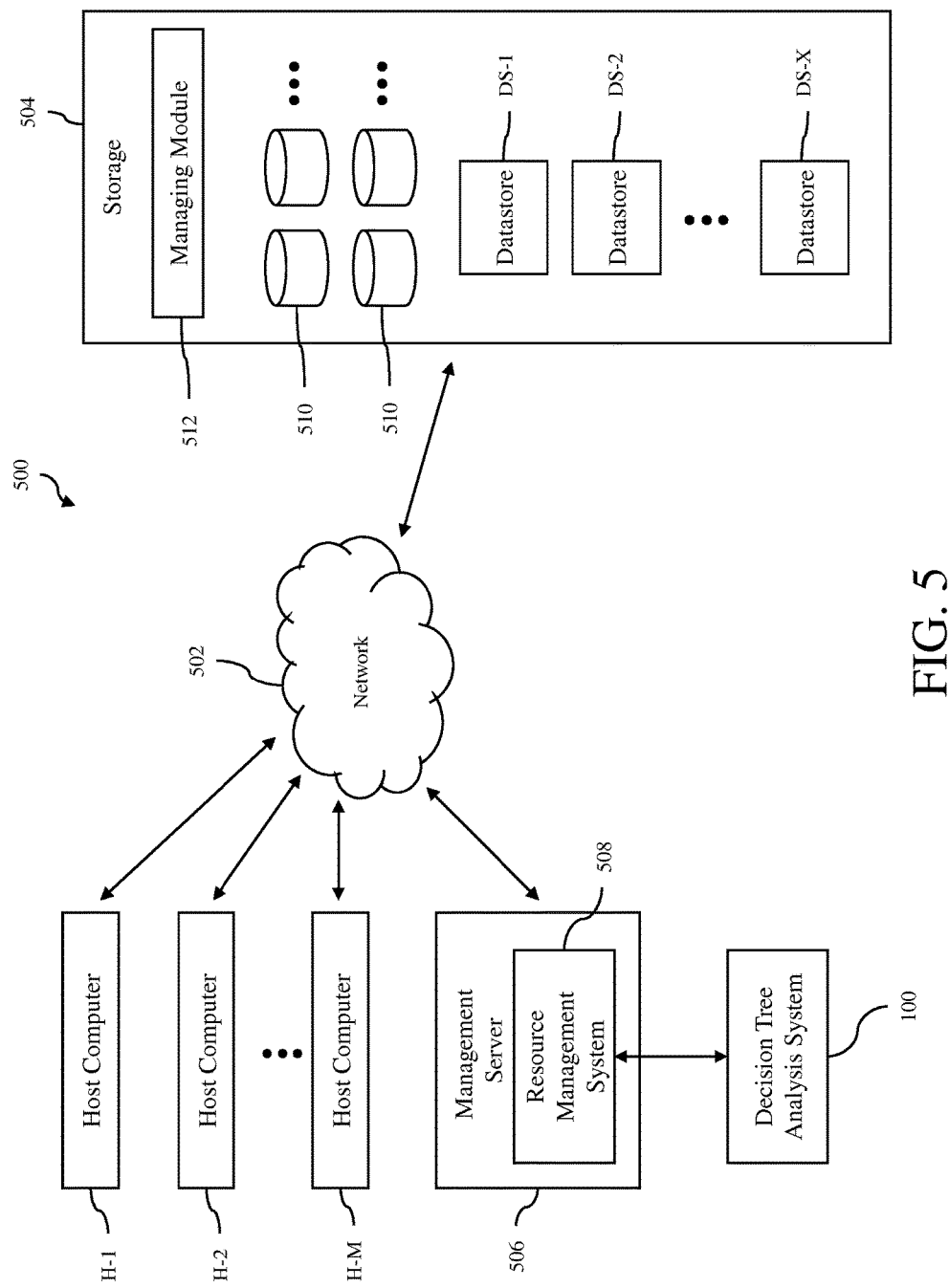
FIG. 5 is a block diagram of a distributed computer system, which can be analyzed by the decision tree analysis system in accordance with an embodiment of the invention.

Turning now to FIG. 5, a distributed computer system 500 in accordance with an embodiment of the invention is shown. As shown in FIG. 5, the distributed computer system includes a network 502, a cluster of host computers H-1, H-2 . . . H-M (where M is a positive integer), storage 504, a management server 506 with a resource management system 508. The host computers, the storage and the management server are connected to the network. Thus, each of the host computers is able to access the storage via the network and may share the resources provided by the storage with the other host computers. Consequently, any process running on any of the host computers may also access the storage via the network.

The host computers H-1, H-2 . . . H-M are physical computer systems that hosts or supports one or more clients so that the clients are executing on the physical computer systems. As used herein, the term "client" is any software entity that can run on a computer system, such as a software application, a software process or a virtual machine (VM). The host computers may be servers that are commonly found in datacenters. As an example, the host computers may be servers installed in a single server rack. However, in other embodiments, the host computers may be installed in multiple server racks in the same or different facilities.

Figure 6:
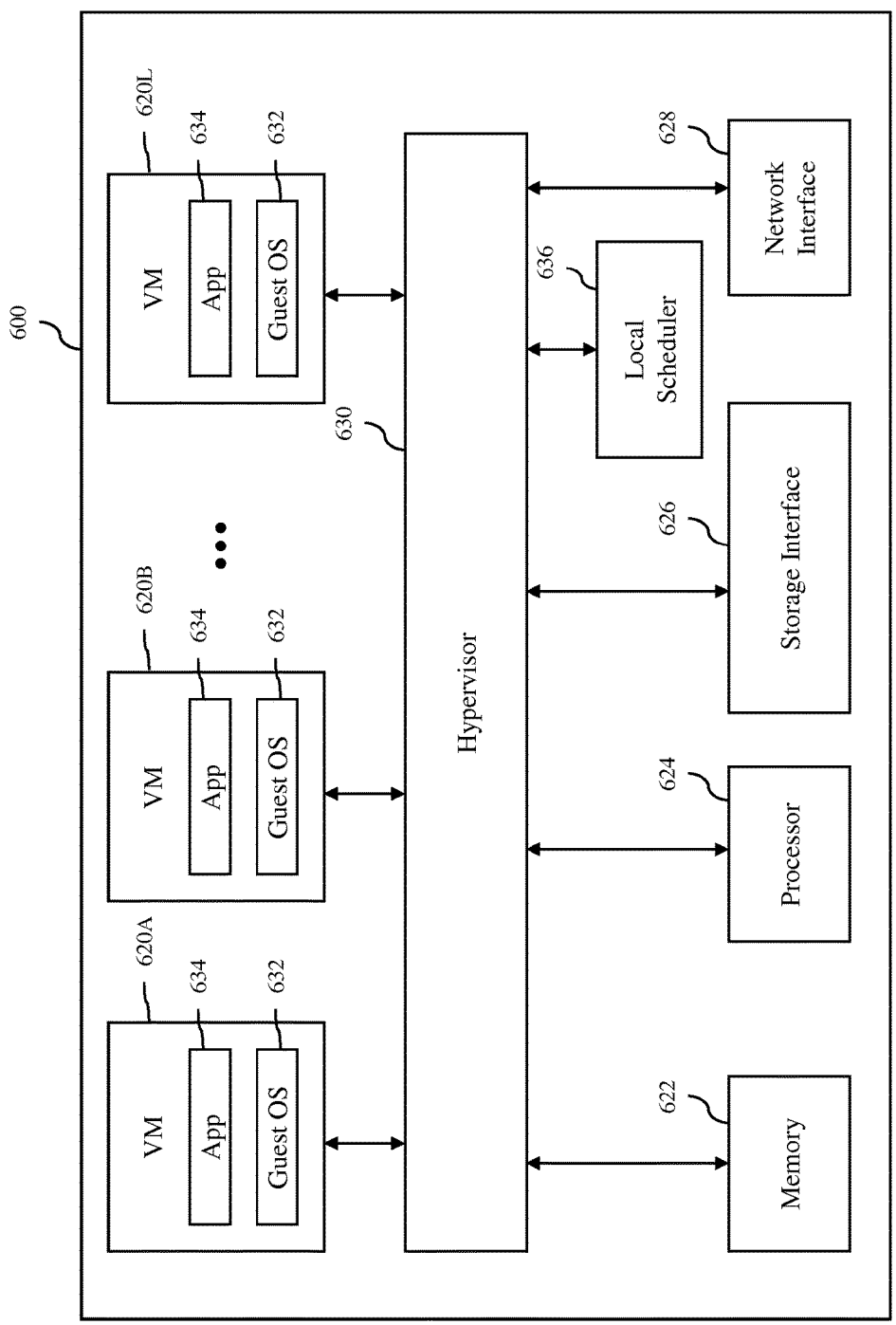
FIG. 6 is a block diagram of a host computer in accordance with an embodiment of the invention.

Turning now to FIG. 6, components of a host computer 600 that is representative of the host computers H-1, H-2 . . . H-M in accordance with an embodiment of the invention are shown. In FIG. 6, the physical connections between the various components of the host computer are not illustrated. In the illustrated embodiment, the host computer is configured to support a number of clients 620A, 620B . . . 620L (where L is a positive integer), which are VMs. The number of VMs supported by the host computer can be anywhere from one to more than one hundred. The exact number of VMs supported by the host computer is only limited by the physical resources of the host computer. The VMs share at least some of the hardware resources of the host computer, which include one or more system memories 622, one or more processors 624, a storage interface 626, and a network interface 628. Each system memory 622, which may be random access memory (RAM), is the volatile memory of the host computer. Each processor 624 can be any type of a processor, such as a central processing unit (CPU) commonly found in a server. The storage interface 626 is an interface that allows that host computer to communicate with the storage 504. As an example, the storage interface may be a host bus adapter or a network file system interface. The network interface 628 is an interface that allows the host computer to communicate with other devices connected to the network 502. As an example, the network interface may be a network adapter.

In the illustrated embodiment, the VMs 620A, 620B ... 620L run on "top" of a hypervisor 630, which is a software interface layer that, using virtualization technology, enables sharing of the hardware resources of the host computer 600 by the VMs. However, in other embodiments, one or more of the VMs can be nested, i.e., a VM running in another VM. Any computer virtualization architecture can be implemented. For example, the hypervisor may run on top of the host computer's operating system or directly on hardware of the host computer. With the support of the hypervisor, the VMs provide isolated execution spaces for guest software. Each VM may include a guest operating system 632 and one or more guest applications 634. The guest operating system manages virtual system resources made available to the corresponding VM by hypervisor 630, and, among other things, guest operating system 632 forms a software platform on top of which guest applications 634 run.

Similar to any other computer system connected to the network 502, the VMs 620A, 620B ... 620L are able to communicate with other computer systems connected to the network using the network interface 628 of the host computer 600. In addition, the VMs are able to access the storage 504 using the storage interface 626 of the host computer.

The host computer 600 also includes a local scheduler 636 that operates as part of a resource management system, such as VMware Distributed Resource Scheduler (DRS), to manage resource requests made by the VMs 620A, 620B ... 620L. Although the local scheduler is illustrated in FIG. 6 as being separate from the hypervisor 230, the local scheduler may be implemented as part of the hypervisor. In some embodiments, the local scheduler is implemented as software programs running on the host computer. However, in other embodiments, the local scheduler may be implemented using any combination of software and hardware.

Turing back to FIG. 5, the network 502 can be any type of computer network or a combination of networks that allows communications between devices connected to the network. The network 502 may include the Internet, a wide area network (WAN), a local area network (LAN), a storage area network (SAN), a fibre channel network and/or other networks. The network 502 may be configured to support protocols suited for communications with storage arrays, such as Fibre Channel, Internet Small Computer System Interface (iSCSI), Fibre Channel over Ethernet (FCoE) and HyperSCSI.

The storage 504 is used to store data for the host computers H-1, H-2 ... H-M of the cluster, which can be accessed like any other storage device connected to computer systems. In an embodiment, the storage can be accessed by entities, such as clients running on the host computers, using any file system, e.g., virtual machine file system (VMFS) or network file system (NFS). The storage includes one or more computer data storage devices 510, which can be any type of storage devices, such as solid-state devices (SSDs), hard disks or a combination of the two. At least some of these storage devices may be local storage devices of the host computers, e.g., locally attached disks or SSDs within the host computers. The storage devices may operate as components of a network-attached storage (NAS) and/or a storage area network (SAN). The storage includes a storage managing module 512, which manages the operation of the storage. In an embodiment, the storage managing module is a computer program executing on one or more computer systems (not shown) of the storage. The storage supports multiple datastores DS-1, DS-2 ... DS-X (where X is a positive integer), which may be identified using logical unit numbers (LUNs). In an embodiment, the datastores are virtualized representations of storage facilities. Thus, each datastore may use the storage resource from more than one storage device included in the storage. The datastores are used to store data associated with the clients supported by the host computers of the cluster. For virtual machines, the datastores may be used to store virtual storage, e.g., virtual disks, used by each of the virtual machines, as well as other files needed to support the virtual machines.

The management server 506 operates to monitor and manage the host computers H-1, H-2 ... H-M in the cluster. The management server includes the resource management system 508, which is configured to perform resource management operations for the cluster, such as, but not limited to, resource allocation, load balancing and placement of clients on different host computers in the cluster. The resource management system may be implemented in any combination of hardware and software. In a particular implementation, the resource management system may be implemented as software programs that are executed by one or more processors of the one or more physical computers that are supporting the resource management system, such as the processors of the management server.

The resource management system 508 utilizes the decision tree analysis system 100 to perform decision tree analyses for resource management operations. These decision tree analyses may involve making decisions regarding one or more configurations or parameters associated with the cluster of host computers H-1, H-2 ... H-M that affects the operational state of the cluster. In an embodiment, in order to perform load balancing, the resource management system utilizes the decision tree analysis system to perform a decision tree analysis, where the root node of the decision tree is the current operating state of the cluster of host computers H-1, H-2 ... H-M and child nodes one each lower level of the decision tree represents possible states of the cluster if a single client in the cluster, e.g., a virtual machines, is migrated or moved from its original host computer in the cluster to another host computer in the cluster. Thus, each of the child nodes represent a unique state of the cluster of host computers that can be achieved from the state represented by the parent node. In this embodiment, the states of the cluster represented by the nodes on the decision tree have multiple attributes, which are reflected in attribute values associated with the nodes on the decision tree. As an example, these attributes may include memory and CPU states. The results of the decision tree analysis, which include the navigation path showing which clients, e.g., virtual machines, should be migrated into which host computers, are then used by the resource management system to execute the migrations, which may be performed automatically with or without user approval.

In some embodiments, the decision tree analysis system 100 may be implemented as one or more software programs that are executed by one or more processors of the one or more physical computers that are supporting the resource management system 508, such as the processors of the management server 506.

Figure 7:
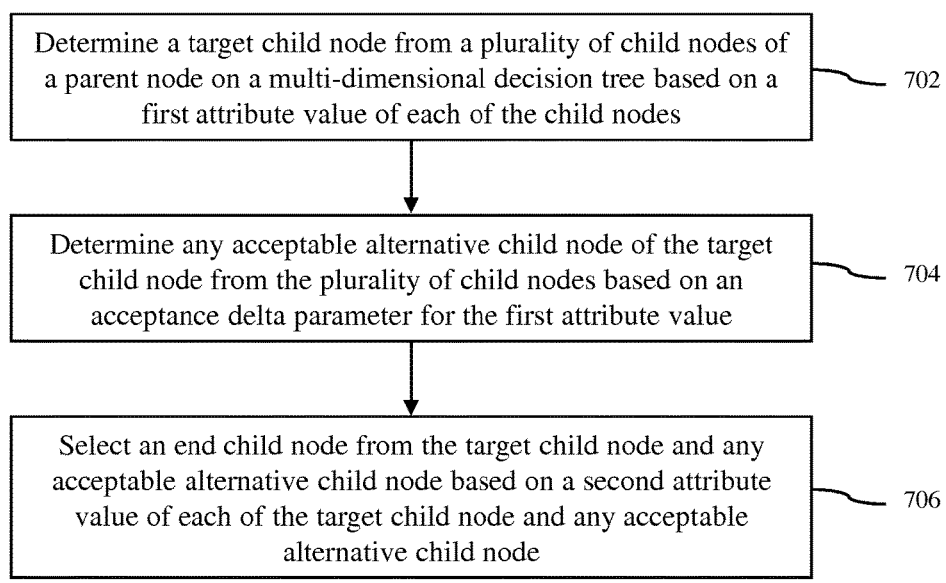
FIG. 7 is a flow diagram of a method for navigating a multi-dimensional decision tree in accordance with an embodiment of the invention.

A method for navigating a multi-dimensional decision tree in accordance with an embodiment of the invention is now described with reference to the process flow diagram of FIG. 7. At block 702, a target child node is determined from a plurality of child nodes of a parent node on the multi-dimensional decision tree based on a first attribute value of each of the child nodes. At block 704, any acceptable alternative child node of the target child node is determined from the plurality of child nodes based on an acceptance delta parameter for the first attribute value, where the acceptance delta parameter defines a value range about the first attribute value of the target child node within which a child node is determined to be an acceptable alternative child node of the target child node. At block 706, an end child node is selected from the target child node and any acceptable alternative child node based on a second attribute value of each of the target child node and any acceptable alternative child node, wherein the parent node and the end child node define a single step of a navigation path for the multi-dimensional decision tree.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for navigating a multi-dimensional decision tree, the method comprising:
determining a target child node from a plurality of child nodes of a parent node on the multi-dimensional decision tree based on a first attribute value of each of the child nodes, the multi-dimensional decision tree being a decision tree for resource management operations for a cluster of physical host computers, wherein the parent node represents a state of the cluster of physical host computers and wherein the target child node represents a first consequential state of the cluster of physical host computers that can be achieved from the state of the cluster of physical host computers represented by the parent node;
determining at least one acceptable alternative child node of the target child node from the plurality of child nodes based on an acceptance delta parameter for the first attribute value, the acceptance delta parameter defining a value range about the first attribute value of the target child node within which a child node is determined to be an acceptable alternative child node of the target child node, wherein each of the at least one acceptable alternative child node represents a second consequential state of the cluster of physical host computers that can be achieved from the state of the cluster of physical host computers represented by the parent node;
selecting an end child node from the target child node and the at least one acceptable alternative child node based on a second attribute value of each of the target child node and the at least one acceptable alternative child node, wherein the parent node and the end child node define a single step of a navigation path for the multi-dimensional decision tree that affects an operational state of the cluster of physical host computers; and
performing a load balancing operation for the cluster of physical host computers based on the selected end child node.

2. The method of claim 1, wherein an attribute corresponding to the second attribute value is the last attribute of multiple attributes for each of the child nodes.

3. The method of claim 2, further comprising setting a processing order of the multiple attributes for each of the child nodes so that one of the multiple attributes is designated as an attribute corresponding to the first attribute value and another attribute of the multiple attributes is designated as the attribute corresponding to the second attribute value.

4. The method of claim 2, wherein the step of determining the target child node and the step of determining the at least one acceptable alternative child node of the target child node are repeated for each of the multiple attributes except for the last attribute to select the end child node.

5. The method of claim 4, wherein the step of determining the target child node and the step of determining the at least one acceptable alternative child node of the target child node that are repeated for each of the multiple attributes includes using different acceptance parameters.

6. The method of claim 1, wherein the determining of the target child node includes selecting one of the child nodes having the highest first attribute value among the child nodes.

7. The method of claim 6, wherein the selecting of the end child node includes selecting one of the target child node and the at least one acceptable alternative child node having the highest second attribute value among the target child node and the at least one acceptable alternative child node.

8. The method of claim 1, wherein each of the child nodes represent a unique state of the cluster of physical host computers with virtual machines running on at least some of the physical host computers that can be achieved from the state of the cluster of physical host computers represented by the parent node.

9. The method of claim 8, wherein the unique state of the cluster of physical host computers is a result of one or more of the virtual machines being migrated from a source host computer to a destination host computer.

10. A non-transitory computer-readable storage medium containing program instructions for method for navigating a multi-dimensional decision tree, wherein execution of the program instructions by one or more processors of a computer system causes the one or more processors to perform steps comprising:
determining a target child node from a plurality of child nodes of a parent node on the multi-dimensional decision tree based on a first attribute value of each of the child nodes, the multi-dimensional decision tree being a decision tree for resource management operations for a cluster of physical host computers, wherein the parent node represents a state of the cluster of physical host computers and wherein the target child node represents a first consequential state of the cluster of physical host computers that can be achieved from the state of the cluster of physical host computers represented by the parent node;
determining at least one acceptable alternative child node of the target child node from the plurality of child nodes based on an acceptance delta parameter for the first attribute value, the acceptance delta parameter defining a value range about the first attribute value of the target child node within which a child node is determined to be an acceptable alternative child node of the target child node, wherein each of the at least one acceptable alternative child node represents a second consequential state of the cluster of physical host computers that can be achieved from the state of the cluster of physical host computers represented by the parent node;
selecting an end child node from the target child node and the at least one acceptable alternative child node based on a second attribute value of each of the target child node and the at least one acceptable alternative child node, wherein the parent node and the end child node define a single step of a navigation path for the multi-dimensional decision tree that affects an operational state of the cluster of physical host computers; and
performing a load balancing operation for the cluster of physical host computers based on the selected end child node.

11. The computer-readable storage medium of claim 10, wherein an attribute corresponding to the second attribute value is the last attribute of multiple attributes for each of the child nodes.

12. The computer-readable storage medium of claim 11, where the steps further comprise setting a processing order of the multiple attributes for each of the child nodes so that one of the multiple attributes is designated as an attribute corresponding to the first attribute value and another attribute of the multiple attributes is designated as the attribute corresponding to the second attribute value.

13. The computer-readable storage medium of claim 11, wherein the step of determining the target child node and the step of determining the at least one acceptable alternative child node of the target child node are repeated for each of the multiple attributes except for the last attribute to select the end child node.

14. The computer-readable storage medium of claim 13, wherein the step of determining the target child node and the step of determining the at least one acceptable alternative child node of the target child node that are repeated for each of the multiple attributes includes using different acceptance parameters.

15. The computer-readable storage medium of claim 10, wherein the determining of the target child node includes selecting one of the child nodes having the highest first attribute value among the child nodes.

16. The computer-readable storage medium of claim 15, wherein the selecting of the end child node includes selecting one of the target child node and the at least one acceptable alternative child node having the highest second attribute value among the target child node and the at least one acceptable alternative child node.

17. The computer-readable storage medium of claim 10, wherein each of the child nodes represent a unique state of the cluster of physical host computers with virtual machines running on at least some of the physical host computers that can be achieved from the state of the cluster of physical host computers represented by the parent node.

18. The computer-readable storage medium of claim 17, wherein the unique state of the cluster of physical host computers is a result of one or more of the virtual machines being migrated from a source host computer to a destination host computer.

19. A decision tree analysis system comprising:
memory; and
a processor configured to:
determine a target child node from a plurality of child nodes of a parent node on the multi-dimensional decision tree based on a first attribute value of each of the child nodes, the multi-dimensional decision tree being a decision tree for resource management operations for a cluster of physical host computers, wherein the parent node represents a state of the cluster of physical host computers and wherein the target child node represents a first consequential state of the cluster of physical host computers that can be achieved from the state of the cluster of physical host computers represented by the parent node;
determine at least one acceptable alternative child node of the target child node from the plurality of child nodes based on an acceptance delta parameter for the first attribute value, the acceptance delta parameter defining a value range about the first attribute value of the target child node within which a child node is determined to be an acceptable alternative child node of the target child node, wherein each of the at least one acceptable alternative child node represents a second consequential state of the cluster of physical host computers that can be achieved from the state of the cluster of physical host computers represented by the parent node;
select an end child node from the target child node and the at least one acceptable alternative child node based on a second attribute value of each of the target child node and the at least one acceptable alternative child node, wherein the parent node and the end child node define a single step of a navigation path for the multi-dimensional decision tree that affects an operational state of the cluster of physical host computers; and perform a load balancing operation for the cluster of physical host computers based on the selected end child node.

20. The decision tree analysis system of claim 19, wherein an attribute corresponding to the second attribute value is the last attribute of multiple attributes for each of the child nodes.

21. The decision tree analysis system of claim 20, wherein the processor is configured to repeatedly determine the target child node and the at least one acceptable alternative child node of the target child node for each of the multiple attributes except for the last attribute to select the end child node.

22. The decision tree analysis system of claim 21, wherein the processor is configured to repeatedly determine the target child node and the at least one acceptable alternative child node of the target child node for each of the multiple attributes using different acceptance parameters.

23. The decision tree analysis system of claim 19, wherein the processor is configured to determine the target child node by selecting one of the child nodes having the highest first attribute value among the child nodes.

24. The decision tree analysis system of claim 19, wherein the processor is configured to select one of the target child node and the at least one acceptable alternative child node having the highest second attribute value among the target child node and the at least one acceptable alternative child node to select the end child node.

\* \* \* \* \*